United States Patent
Salamat et al.

(10) Patent No.: US 9,266,604 B2
(45) Date of Patent: Feb. 23, 2016

(54) COMPLEX-DYNAMIC AIR AND GROUND VEHICLE CONTROL INCEPTOR

(71) Applicant: Mason Electric Co., Sylmar, CA (US)

(72) Inventors: Bijan Salamat, Santa Clarita, CA (US); Jorge J. Sanguinetti, Los Angeles, CA (US); Robert J. Myles, Reseda, CA (US); Avetis Stepanian, Winnetka, CA (US); Andrew K. Gabler, Toluca Lake, CA (US)

(73) Assignee: Mason Electric Company, Sylmar, CA (US)

( * ) Notice: Subject to any disclaimer, the term of this patent is extended or adjusted under 35 U.S.C. 154(b) by 119 days.

(21) Appl. No.: 13/944,800

(22) Filed: Jul. 17, 2013

(65) Prior Publication Data

US 2014/0021303 A1 Jan. 23, 2014

Related U.S. Application Data

(60) Provisional application No. 61/672,700, filed on Jul. 17, 2012.

(51) Int. Cl.
*B64C 13/04* (2006.01)
*B64C 27/04* (2006.01)

(52) U.S. Cl.
CPC *B64C 13/04* (2013.01); *B64C 27/04* (2013.01)

(58) Field of Classification Search
CPC ........ B64C 27/56; B64C 13/04; B64C 13/10; B64C 13/46; B64C 27/54; B64C 27/04; B25J 9/102; G05B 11/01; G05G 9/047; G05G 2009/04762

USPC .......................................... 244/231
See application file for complete search history.

(56) References Cited

U.S. PATENT DOCUMENTS

| | | | | |
|---|---|---|---|---|
| 4,150,803 | A * | 4/1979 | Fernandez | 244/135 A |
| 4,345,195 | A * | 8/1982 | Griffith et al. | 318/628 |
| 4,717,098 | A * | 1/1988 | Walker et al. | 244/223 |
| 5,125,602 | A | 6/1992 | Vauvelle | |
| 5,497,847 | A * | 3/1996 | Ota et al. | 180/333 |
| 6,244,126 | B1 * | 6/2001 | Brooks | 74/423 |
| 6,512,344 | B1 * | 1/2003 | Konno et al. | 318/560 |
| 8,079,281 | B2 * | 12/2011 | Taylor et al. | 74/471 XY |
| 8,271,151 | B2 * | 9/2012 | Hasan et al. | 701/3 |
| 2008/0111515 | A1 * | 5/2008 | Larson et al. | 318/628 |
| 2009/0314884 | A1 | 12/2009 | Elliott et al. | |
| 2010/0025539 | A1 | 2/2010 | Hanlon et al. | |
| 2010/0123045 | A1 * | 5/2010 | Grieser | 244/178 |

OTHER PUBLICATIONS

International Search Report and Written Opinion; PCT Application No. PCT/US2013/50928; Applicant: Mason Electric Company; Date of Mailing: Mar. 21, 2014; 8 pages.

* cited by examiner

*Primary Examiner* — Tien Dinh
*Assistant Examiner* — Vincent Rodriguez
(74) *Attorney, Agent, or Firm* — Perkins Coie LLP

(57) ABSTRACT

A complex-dynamic air and ground vehicle control inceptor assembly that provides active positional control with the capability of back drive (pilot over-ride) via a direct connection between the lever, a high gear-ratio gearbox, and the motor without the use of a clutch.

24 Claims, 5 Drawing Sheets

SIMPLIFIED SERVO CONTROL LOOP PROCESSING

COMPLEX-DYNAMIC AIR AND GROUND VEHICLE CONTROL INCEPTOR

CROSS REFERENCE TO RELATED APPLICATIONS

This application claims the benefit of and priority to U.S. Provisional Patent Application No. 61/672,700, titled Complex-Dynamic Air and Ground Vehicle Control Inceptor, filed Jul. 17, 2012, which is incorporated herein by reference thereto.

TECHNICAL FIELD

Embodiments of the present invention are directed to control systems for vehicle, and more particularly to control inceptors for vehicles.

BACKGROUND

Conventional inceptor controls are used in vehicle to help allow the operator to accurately control the vehicle. Inceptor controls are used, as an example, in aircraft such as helicopters. Helicopter flight laws are extremely complex, and the end result is that multiple simultaneous inputs must be precisely provided to maintain aerodynamic stability. Accordingly, the control systems must provide very accurate control signals to the flight control computer in response to pilot movements or other control input. Conventional helicopter collective controls are coupled to the flight control computer utilizing a plurality of gears, such as spur gears or the like. This gear arrangement, however, requires a clutch that can disengage the gears to allow the pilot to back drive the collective control when needed. The gear and clutch configuration provides a disconnect between the collective control and vehicle's control surfaces, so that the pilot does not receive actual active feedback and cannot feel the actual forces or other input from the control surfaces. There is a need for an improved control inceptor system for vehicles (including aircraft, space vehicles, marine vehicles, and land vehicles) that allows for precise control of the vehicle with a low-power and quick response configuration.

SUMMARY

The present disclosure describes control inceptor assemblies and systems for vehicles that overcomes drawbacks of the prior art and provides additional benefits. At least one embodiment provides active positional control with the capability of back drive (pilot over-ride) via a direct connection between the lever, a high gear-ratio gearbox, and the motor without the use of a clutch. Back driving capability is provided via the use of strain wave gearing, also known as a harmonic gear drive. Control algorithms can provide precise control of the position, rate of motion, and force applied to the control inceptor assembly. At least one embodiment provides a fly-by-wire type helicopter collective pitch automatic control inceptor that minimizes the physical envelope of the inceptor, provides self-contained redundancy, exhibits no single-point-of-failure probability below $10^{-9}$, provides an adjustable kinematic radius, and offers low power consumption.

Embodiments of the control inceptor assembly of the present disclosure can be used in connection with aircraft, such as a helicopter, to assist in managing one of the most critical aspects of flight dynamics, namely maintaining vehicle attitude regardless of maneuver or environment, and doing so with a low power, quick response alternative to traditional collective controls.

The control inceptor assembly of one embodiment described herewith provides dynamic input usable to determine different aspects of a given vehicle attitude dynamics. It is both a manual and automatic air and ground vehicle control inceptor with built-in control laws governing its automatic response yet permitting operator override capability. The control inceptor assembly can be used as the sole means of establishing helicopter collective controlled aerodynamic flight by changing the pitch angle of all the main rotor blades collectively (i.e., all at the same time) and independent of their position. Therefore, when actuated a collective input shall be made and all the blades will change equally. The result shall be that the helicopter will increase or decrease its total lift derived from the rotor. In level flight this would cause a climb or descent, while with the helicopter pitched forward an increase in total lift would produce acceleration together with a given amount of ascent.

At least one embodiment of the present disclosure provides control assembly for a vehicle having a vehicle control system. The control assembly comprises a control arm assembly having a lever arm with first and second portions, a first drive shaft attached to the first portion of the lever arm and being rotatable about a first axis of rotation, and a grip element connected the second portion of the lever arm and spaced apart from the first drive shaft. The lever arm and grip element are pivotable about the first axis of rotation. A harmonic gearbox assembly has a strain wave gear coupled to a second drive shaft spaced apart from the first drive shaft, wherein the second drive shaft is rotatable about a second axis of rotation and rotation of the second drive shaft is coupled to rotation of the strain wave gear. A linkage assembly is connected to the first and second drive shafts, and wherein rotation of the second drive shaft about the second axis of rotation pivots the linkage assembly about the first and second axes of rotation and rotates the first drive shaft about the first axis of rotation. A motor is at least partially controlled by the vehicle control system and is connected to the harmonic gear box assembly that provides a clutch-free, direct connection between the motor, the harmonic gearbox assembly, the linkage assembly and the control arm assembly. The harmonic gearbox assembly can be back driven to provide active resistance to pivotal movement of the inceptor arm and grip assembly.

Another embodiment of the present disclosure provides a control assembly for a vehicle having a vehicle control system. The control assembly has a control arm assembly with a lever arm rotatable about a first axis of rotation and a grip configured to be gripped by a user. A harmonic gearbox assembly has a strain wave gear coupled to a drive shaft spaced apart from the lever arm, wherein the drive shaft is rotatable about a second axis of rotation spaced apart from the first axis of rotation, and rotation of the strain wave gear is coupled to rotation of the drive shaft. A linkage assembly interconnects the lever arm and the drive shaft. Rotation of the drive shaft about the second axis of rotation pivots the linkage assembly about the first and second axes of rotation and pivots the lever arm about the first axis of rotation. A motor is at least partially controlled by the vehicle control system and is connected to the strain wave gear of the harmonic gear box assembly for rotation of the strain wave gear that provides a direct, clutch-free connection between the motor, the harmonic gearbox assembly, the linkage assembly and the control arm assembly, wherein the harmonic gearbox assembly can be back driven to provide active resistance to pivotal movement of the lever arm.

Another aspect of the disclosure provides a collective inceptor assembly for a vehicle having a vehicle control system. The collective inceptor assembly comprises a mounting structure mountable to the vehicle. A first drive shaft is rotatably connected to the mounting structure, wherein the first drive shaft is rotatable about a first axis of rotation. A collective lever arm is connected at a first end portion to the first drive shaft, wherein the collective lever arm is pivotable with the first drive shaft relative to the mounting structure about the first axis of rotation. A grip is connected to a second end portion of the collective lever arm spaced apart from the first end portion, wherein the grip has a plurality of control elements coupled to the vehicle control system and positioned for engagement by a user for operation of at least a portion of the vehicle. A harmonic gearbox assembly is coupled to the mounting structure and has at least one harmonic gear and a second drive shaft. The harmonic gear and the second drive shaft are rotatable relative to the mounting structure about a second axis of rotation spaced apart from the first drive shaft. A linkage assembly interconnects the first and second drive shafts, and the linkage assembly mechanically transmits rotational movement of the first drive shaft to rotational movement of the second drive shaft. A motor is at least partially controlled by the vehicle control system and is connected to the harmonic gear box assembly with a clutch-free interface that provides direct connection between the collective lever arm, the linkage assembly, the harmonic gearbox assembly, and the motor. The harmonic gearbox assembly can be back driven to provide active resistance to pivotal movement of the collective lever arm.

DETAILED DESCRIPTION

The present disclosure describes a control inceptor assembly for vehicles in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1:
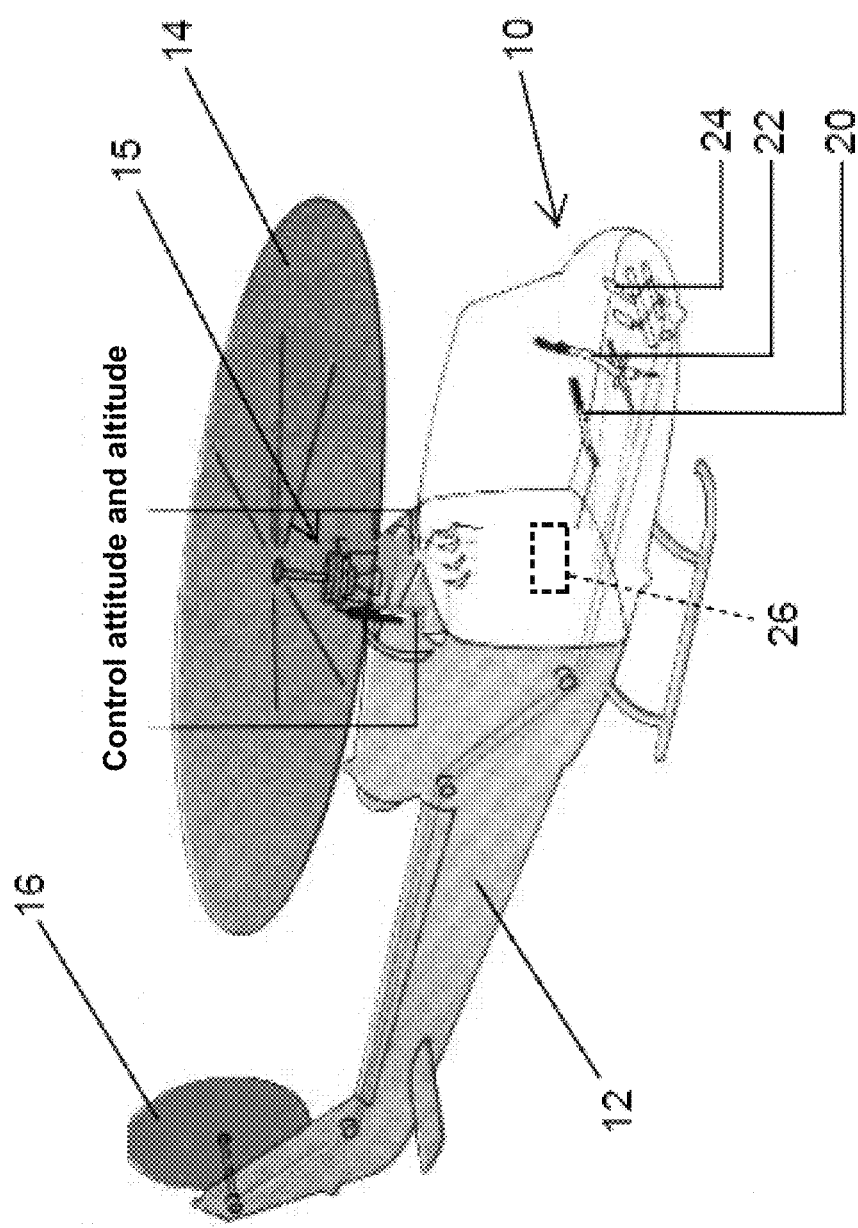
FIG. 1 is a general schematic illustration of controls of a helicopter, including a collective inceptor assembly in accordance with at least one embodiment of the present disclosure.

FIG. 1 is a general schematic illustration of a control system 10 of a helicopter 12 configured to control the blades 14, swashplate 15, and other control surfaces and/or mechanisms. The control system 10 of the illustrated embodiment includes a collective inceptor assembly 20, a cyclic control assembly 22, and tail rotor control assembly 24, all of which are coupled to a flight control system 26. The collective inceptor assembly 20 is a fly-by-wire type helicopter collective pitch automatic control inceptor assembly in accordance with at least one embodiment of the present disclosure. Although the following discussion is related to a collective control inceptor for a helicopter, it is to be understood that the inceptor assembly in accordance with aspects of the present disclosure can be used with other vehicles, including aircraft vehicles, space vehicles, marine vehicles, and land vehicles, to assist in precise and accurate control of the vehicle during operation, while enhancing operator feel and control.

Figure 2:
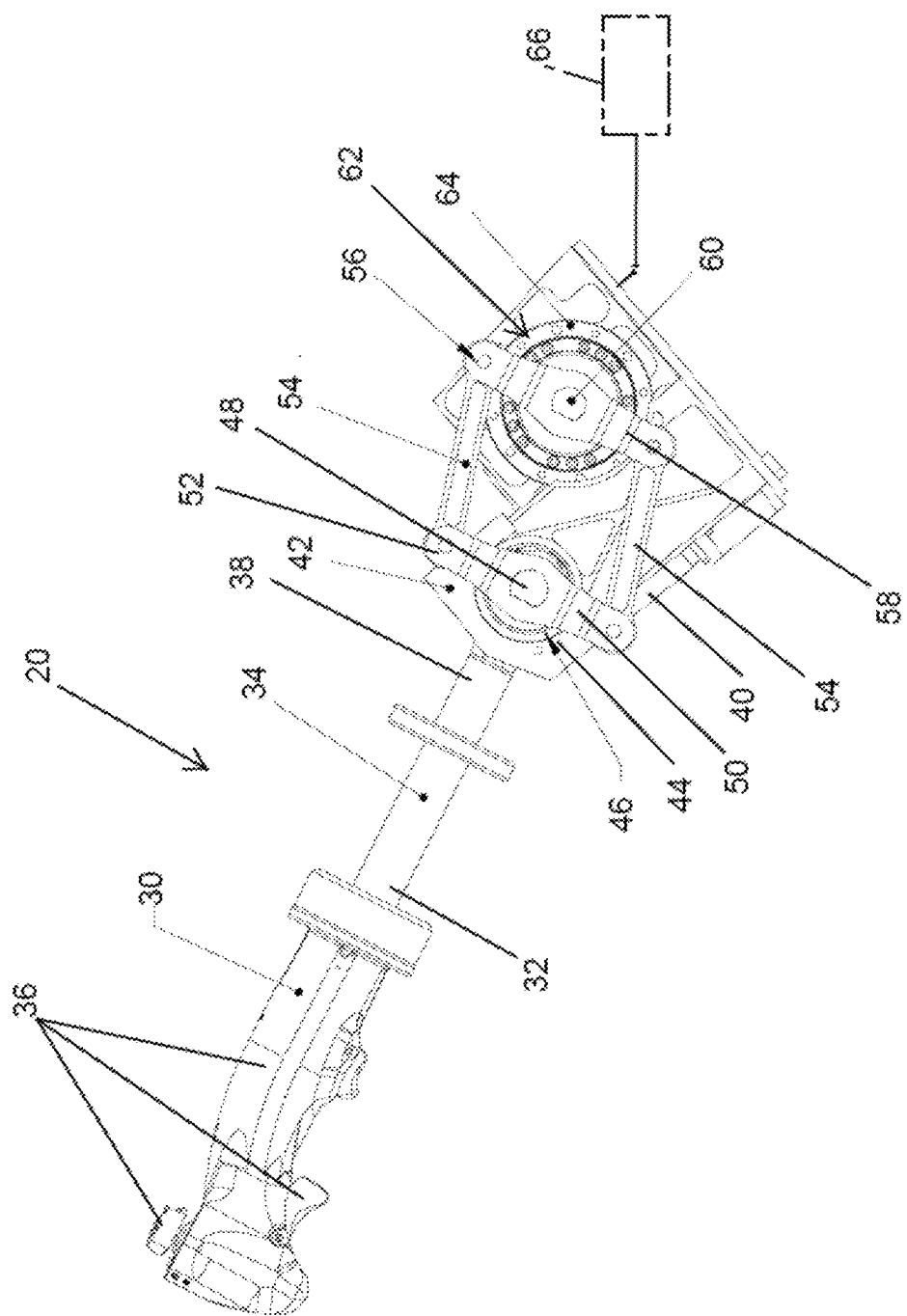
FIG. 2 is a schematic left side elevation view of an inceptor assembly of FIG. 1.

FIG. 2 is a schematic left side elevation view of the inceptor assembly 20 of FIG. 1. The inceptor assembly 20 of the illustrated embodiment includes a grip element 30 operatively connected to a distal end 32 of an adjustable linkage arm, shown as a collective lever arm 34. The grip element 30 can include a plurality of control elements 36, such as a throttle control, switches, actuators, buttons, triggers, or other control elements operatively coupled to the flight control system or other systems associated with the vehicle. The adjustable lever arm 34 can be modified to provide different lengths or to achieve different kinematic radii of the lever arm, for example, to best suit the pilot or to achieve other selected form factors for the assembly 20.

A proximal end 38 of the adjustable lever arm 34 is pivotally connected to a fixed station pivoting point assembly 40. This fixed pivoting point station 40 is configured for securely mounting to a support structure in the helicopter 12 (FIG. 1) or other selected vehicle. The fixed pivoting point station 40 provides a housing structure 42 that receives the proximal end of the lever arm and that contains bearings 44 and gears 46 that allow the linkage arm 34 to smoothly and controllably pivot relative to the housing structure 42.

The bearings 44 and gears 46 are coupled to a central shaft 48 attached to the center portion of an upper coupling bar 50. The upper coupling bar 50 is attached at its free ends 52 to a pair of linkage bars 54 that each attach to the free ends 56 of a lower coupling bar 58. The lower coupling bar 58 is attached at its middle portion to a central shaft 60 operatively connected to a harmonic gearbox assembly 62. The upper and lower coupling bars 50 and 58 and the linkage bars 54 define a linkage assembly that mechanically transmits rotational movement of the central shaft 48, upon pivoting the lever arm 34 to rotational movement of the central shaft 60 of the harmonic gearbox assembly 62.

The harmonic gearbox assembly 62 of the illustrated embodiment includes a strain wave gear, such as a harmonic gear 64 having a high gear ratio and with a configuration that fits within the relatively small space of the housing 42. In the illustrated embodiment, the harmonic gearbox assembly 62 is configured with a gear ratio in the range of, as an example, approximately 80:1-150:1. Other embodiments can provide a harmonic gearbox assembly 62 with different high gear ratios while maintaining a small form factor. The harmonic gearbox assembly 62 is connected to a motor 66 (shown schematically) coupled to and controlled by the flight control computer, which is coupled to the swashplate 15 and blades 14 (FIG. 1).

The harmonic gear assembly 62 of the illustrated embodiment is coupled to the motor 66 without the use of a clutch such that the arrangement provides direct connection between the linkage arm 34, the harmonic gearbox assembly 62 and the motor. This configuration with the clutch-free harmonic gearbox assembly 62 that can be back driven can provide active resistance to movement of the collective lever arm 34 away from a position encouraged by the flight control computer. This direct connection and active resistance allows the pilot to physically feel in real time simulated forces related to the forces from the blades 14 for various flight conditions and situations. The result provides the pilot with a much better and accurate feel for operation of the vehicle, particularly in situations in which the pilot elects to override the flight control computer, such as in emergency or evasive maneuvers.

Accordingly, the inceptor assembly 20 provides control of the collective blades 14 via precise positional control of the lever arm 34, while providing force feedback to the pilot. The inceptor assembly 20 can operate fully automatically via commands from the flight control computer or can be overridden by the pilot. The inceptor assembly 20 also provides precise positional control and force feedback to the vehicle and the pilot. The inceptor assembly 20 also provides the force feedback purely with the use of electro-mechanical actuation and without the use of any springs.

Figure 3:
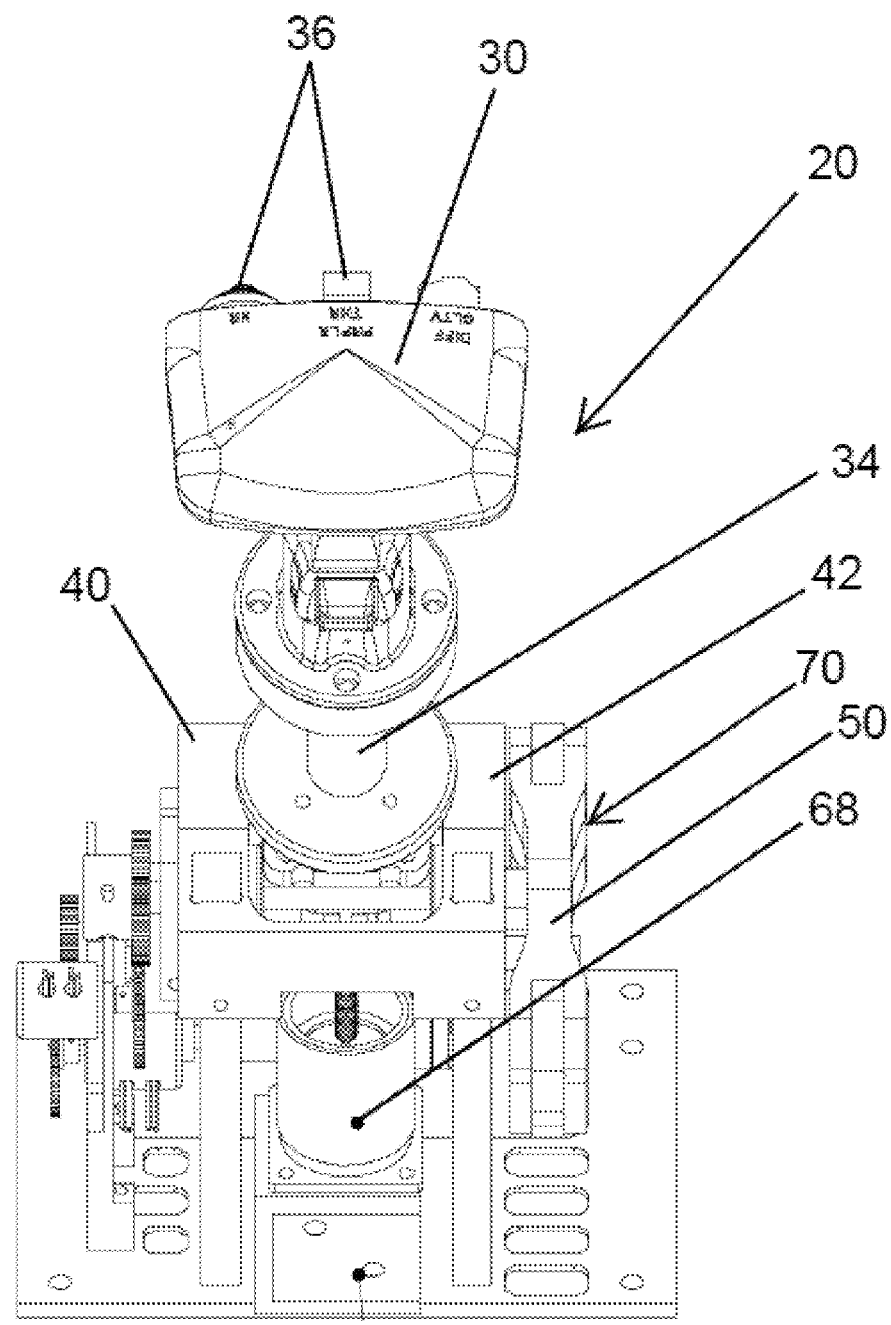
FIG. 3 is a schematic isometric view of the inceptor assembly of FIG. 2.

As best seen in FIG. 3, the inceptor assembly 20 can include a movement dampener 68, such as an airbox dampener, hydraulic dampener, or other dampening mechanism, coupled to the harmonic gearbox assembly 62 and/or the linkage assembly 70 formed by the central shaft 48, the coupling bars 50 and 58 and linkage bars 54 (FIG. 2). The movement dampener 68 is configured to restrict or prevent excessive movement of the collective lever arm 34, thereby minimizing or preventing an excessive high rate of input from a pilot's command. This dampening and controlling of the rate of input movement is similar to the feeling that a pilot is used to in connection with a traditional linkage driven collective.

Figure 4:
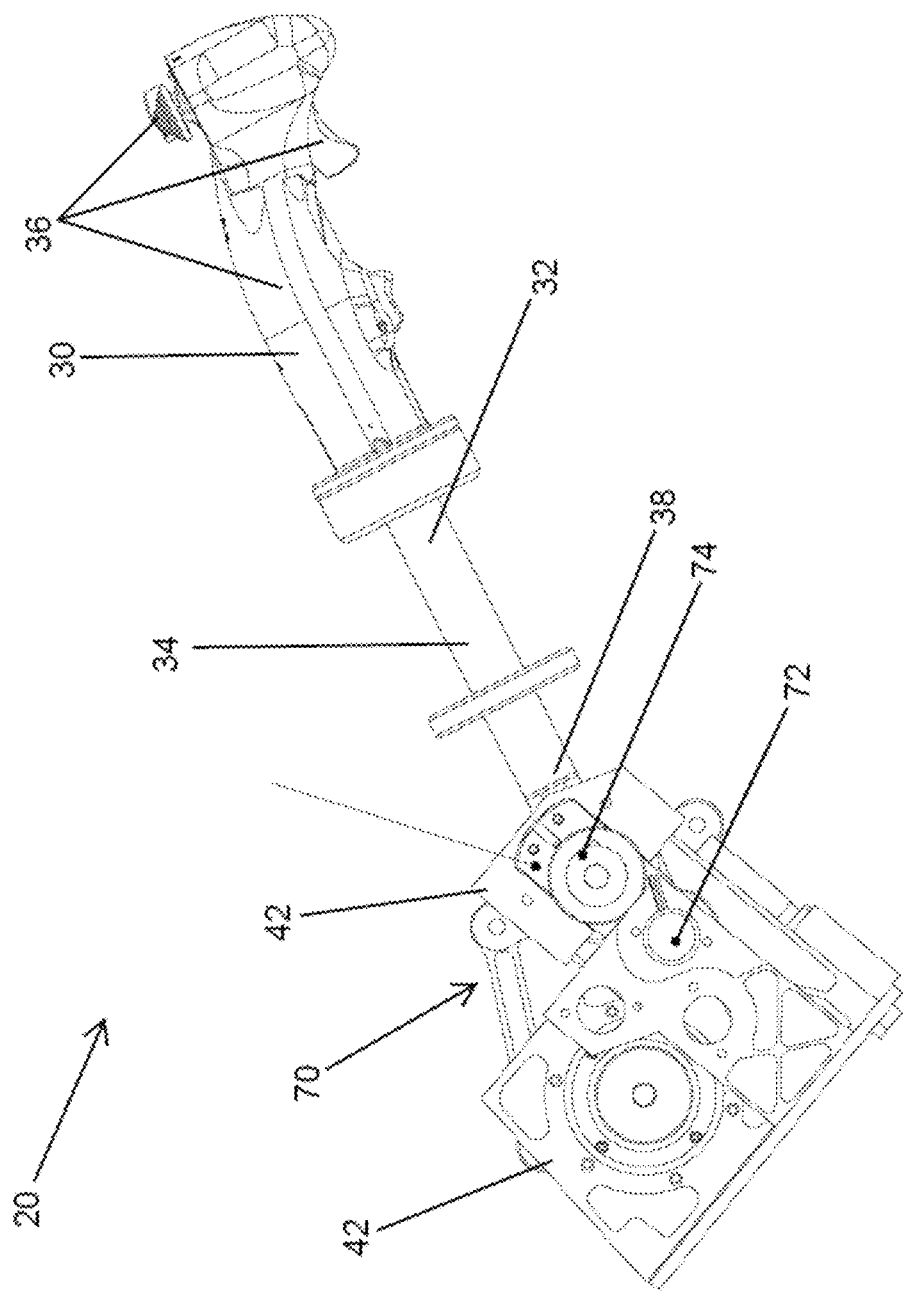
FIG. 4 is a schematic right side elevation view of the inceptor assembly of FIG. 2.

As seen in FIG. 4, the inceptor assembly 20 of the illustrated embodiment can include an angle displacement sensor 72 coupled to the collective lever arm 34 to determine the angular orientation of the lever arm 34. In the illustrated embodiment, the angle displacement sensor 72 can be a Hall effect sensor, a resistive sensor, or other suitable sensor that can accurately detect angle displacement of the lever arm. The angle displacement sensor 72 of the illustrated embodiment is coupled to a rotation multiplier gear 74, which is connected to the collective lever arm 34. The rotation multiplier gear 74 is configured to increase the resolution of the associated angle displacement sensor 72 or other sensor coupled thereto, thereby providing a more dynamic range for greater resolution of the sensor 72.

As indicated above, the collective inceptor assembly 20 is coupled to the flight control system 26. In at least one embodiment, a flight control computer of the flight control system 26 continuously monitors the flight controls, flight surfaces, and other flight systems to help control and maintain controlled and stable flight. To this end, the flight control system 26 monitors the inceptor assembly 22 determine the inceptor assembly's actual position (i.e., "where the inceptor is") and the position where the flight control system indicates or directs that the inceptor assembly 20 should be or needs to be (i.e., "where the inceptor needs to be"). Accordingly, the flight control system 26 continuously and dynamically 'sets' new 'locations' for the inceptor's lever arm 34 based on a number of parameters. This dynamic motion is compounded because the pilot is free to exert input on the inceptor assembly 20 at any moment, even in total disagreement with what an automatic control portion of the flight control system 26 might order the inceptor assembly 20 to do. Typically, the information regarding "where the inceptor is" will often be different from the information regarding "where the inceptor needs to be."

To reconcile this disparity and to make the inceptor assembly 20 reflect the actual position and the forces that the aircraft is subject to and/or responding to, a 'closed loop' method of controlling the position of the lever arm 34 is utilized. The inceptor assembly 20 of the illustrated embodiment uses a Proportional, Integral, and Derivative (PID) control loop approach to achieve this reconciliation. In connection with this PID control loop, a controller of the flight control system 26 receives a set-point request from (in this case) the Flight Control System via a Flight Control Command and compares the set point to a measured feedback originating from the angular position sensor 72. This set-point can be thought of as a position generally corresponding to "where the inceptor needs to be," and the measured feedback can be thought of as a position generally corresponding to "where the inceptor is." The difference between the set-point and feedback is called the error $\epsilon$. The controller is configured to eliminate this error $\epsilon$, so that the feedback corresponds to the set point; in other words, "where the inceptor is" matches "where the inceptor needs to be."

In the illustrated embodiment, the PID control loop is predicated on the Proportional, Integral, and Derivative factors. For purposes of completeness, the Proportional factor refers to a constant multiple. A number is a proportion to another if there exists a constant "n" such that y=nx. This "n" can be positive or negative, greater or less than one. For the control loop of the present disclosure, the Proportional factor "n" is given by KP, and the x term is the control loop error $\epsilon$, in other words; y=KP($\epsilon$).

One skilled in the art will recognize that the output of the Proportional factor is the product of a 'gain' ratio and the measured error $\epsilon$. The larger the Proportional factor's gain or error results in a greater output from the Proportional factor. If the Proportional gain is set too high, a controller will typically repeatedly overshoot the set-point, leading to instability in the form of oscillation. If a control loop only uses the Proportional factor, the error $\epsilon$ becomes too small, and the loop output becomes negligible. Accordingly, even when the Proportional loop reaches steady state, there would still be error $\epsilon$. The larger the Proportional gain, the smaller the steady state error; but the larger the Proportional gain, the more likely the loop is to become unstable. This dilemma leads to a steady-state error referred to as offset. Accordingly, the control loop uses another factor, namely the Integral factor, to compensate for an inherent disadvantage of a Proportional-only control loop.

The Integral factor refers to the summation of a function over a given interval. In the case of the controller, Integral factor is the sum of error $\epsilon$ over time, or; the term y will be given by y=∫f ($\epsilon$)dt. The Integral factor acts as an 'accumulator' where the loop stores all measured error (∫$\epsilon$). It is noted that, in the motion system, the error $\epsilon$ typically can be positive or negative, so sometimes error $\epsilon$ 'adds-up' to the accumulator (when positive error $\epsilon$ is added to positive error or negative error $\epsilon$ is added to negative) and sometimes the error $\epsilon$ subtracts from the accumulator—as when positive error is added to negative, or vice versa. Typically the accumulator is nearly always empty. Even when error $\epsilon$ is so small that the Proportional factor is no longer effective, the Integral factor portion of the control loop continues to collect error $\epsilon$ until the error $\epsilon$ is large enough to matter. Then the resulting consequence is to eliminate steady-state offset. Accordingly, the inceptor assembly and associated control system uses the Integral factor to achieve its stability at steady state.

In the illustrated embodiment, the control loop for the inceptor assembly and associated control system includes a reset function on the Integral factor to aid in achieving stability. By resetting the Integral factor when a control loop is in steady state, the motion controller output drops—momentarily—to zero as the Integral accumulator is emptied or is otherwise reset.

The Derivative factor corresponds to the rate of change during a given interval as interpreted by a PID controller where the term y is solved as y=d(ε)/dt. The Derivative factor is configured to correct present error versus error the last time it was checked. In other words, the Derivative factor is looking at the rate of change of the error Δε. The more error ε changes or the longer the derivative time, the larger the Derivative factor becomes. The effect of the Derivative factor is to counteract any overshoot caused by the Proportion and Integral factors. When the error ε is large, the Proportional and Integral factors will push the controller output. This controller response makes error ε change quickly, which in turn causes the Derivative factor to more aggressively counteract the Proportional and Integral factors. Accordingly, the control loop is configured with the Derivative factor to allow for more aggressive Proportional and Integral factors. Further, larger derivative time makes the Derivative factor more aggressively dampen the Proportional and Integral factors outputs.

All three of these factors (P, I, and D) create output based on measured error of the process being regulated. The expectation is that, in a stable loop, any changes in error caused by set-point changes or process disturbances (i.e. pilot input) are quickly eliminated by the combination of the three P, I and D factors.

Figure 5:
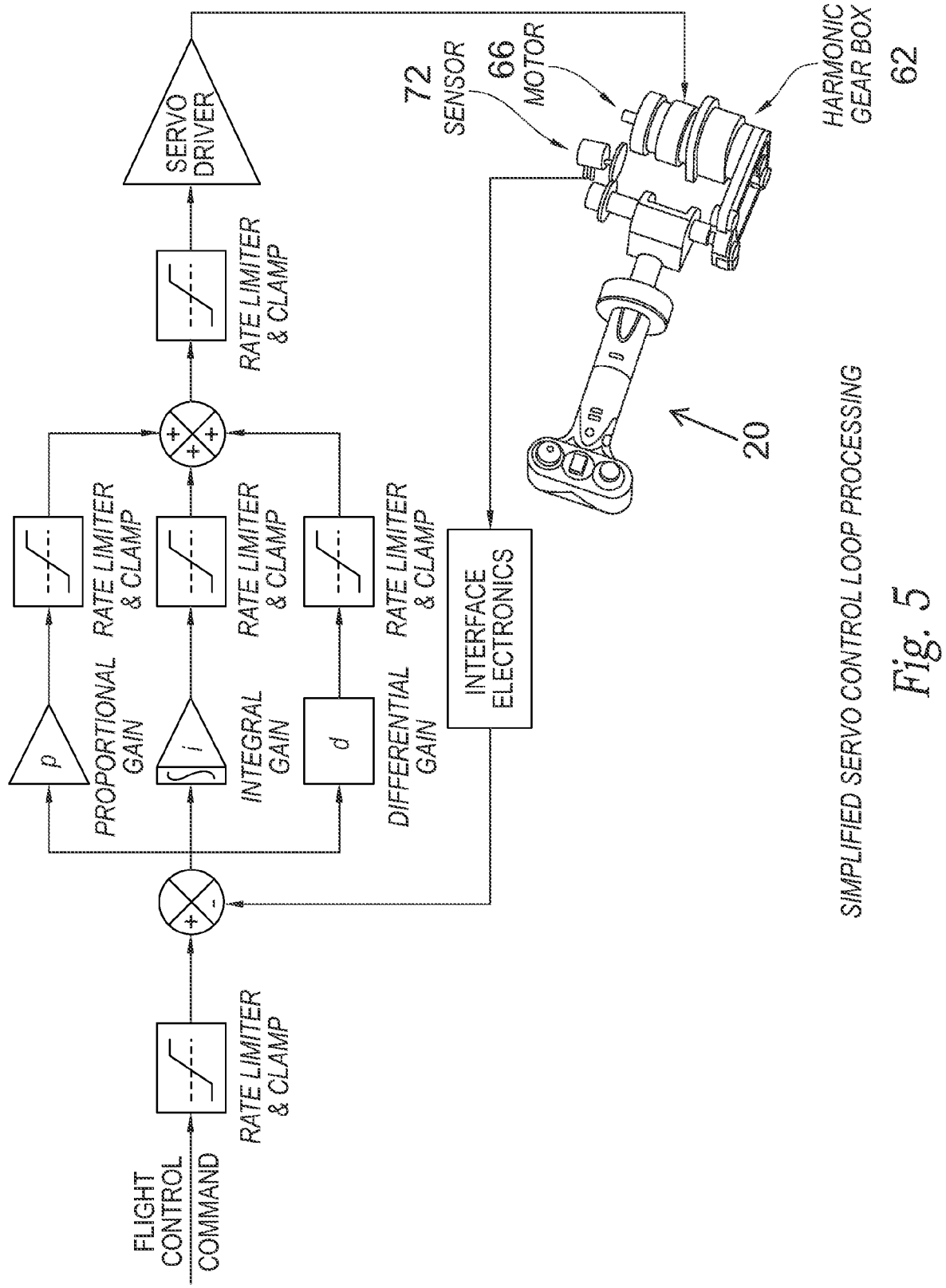
FIG. 5 is a schematic flow diagram for a servo control loop process of an embodiment.

FIG. 5 is a schematic diagram depicting a simplified view of the PID control loop in use in accordance with at least one embodiment. It can be seen that in the inceptor assembly's control loop arrangement; there are several "limiters" (rate limiters or "clamps") added to ensure that the parameters provided by the system or by the pilot input and/or the result of the P, I and D calculations can never produce an output (or accept as input) a magnitude that will potentially exceed the flight envelope of the aircraft or the performance requirements of the system.

When the vehicle reaches a stable state (be that in flight mode or in hover mode), the flight control system might automatically enter (or be commanded to enter) a "trim mode". In this trim mode condition, the PID control loop uses the 'actual' position of the inceptor's lever arm 34 to determine where to 'return to' if disturbed while applying force-feedback opposing the disturbance proportional to the magnitude of the displacement from the 'trim point' in the trim mode. Such motion can be induced by pilot input, and needs to be counteracted by a set force and rate of motion, such as by modulating motor current, as a way to counter the disturbance and return the inceptor to the 'set-point' from which departed initially.

In a 'non-trimmed' mode, the PID control loop will verify that the vehicle's motion control system, under flight system control, is moving the lever arm 34 to the set point (i.e., "where the inceptor needs to be") as compared to the feedback (i.e., where the inceptor is), if the inceptor positions differ. FIG. 5 also shows how each of the elements described above add up to provide a 'continuously and dynamically' adjusted lever arm position (via the motor's motion and its associated strain wave gearing (harmonic gear)) based on the reported 'lever arm position' as read by the feedback sensor. In another embodiment that utilizes a more complex system, a secondary PID control loop can be added (as a loop within a loop or as a cascaded loop) to control individual aspects of the system operation; for example a servomotor driving current.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

We claim:

1. A control assembly for a vehicle having a vehicle control system, comprising:
   a housing assembly fixedly attached to the vehicle;
   a control arm assembly having a lever arm with first and second portions, a first drive shaft mounted in the first fixed position in the housing assembly, the first drive shaft being attached to the first portion of the lever arm and being rotatable about a first axis of rotation, and a grip element connected the second portion of the lever arm and spaced apart from the first drive shaft, wherein the grip element is configured to be engaged by a user, the lever arm and grip element being pivotable about the first axis of rotation;
   a harmonic gearbox assembly mounted in a second fixed position in the housing and having a strain wave gear coupled to a second drive shaft spaced apart from the first drive shaft by a fixed distance, wherein the second drive shaft is rotatable about a second axis of rotation and rotation of the second drive shaft is coupled to rotation of the strain wave gear;
   a linkage assembly connected to the first and second drive shafts, and wherein rotation of the second drive shaft about the second axis of rotation pivots the linkage assembly about the first and second axes of rotation and rotates the first drive shaft about the first axis of rotation; and
   a motor at least partially controlled by the vehicle control system and coupled to the harmonic gear box assembly that provides a clutch-free, direct connection between the motor, the harmonic gearbox assembly, the linkage assembly and the control arm assembly, wherein the harmonic gearbox assembly is configured to be back driven to provide active resistance to pivotal movement of the lever arm.

2. The control assembly of claim 1 wherein the control arm assembly is a collective inceptor assembly, and further comprising a cyclic control assembly and a tail rotor control assembly operatively coupled to the vehicle control system.

3. The control assembly of claim 1 wherein the grip element includes a plurality of control elements coupled to the vehicle control system.

4. The control assembly of claim 1 wherein the lever arm is an adjustable collective lever arm.

5. The control assembly of claim 1 wherein the housing assembly comprises a bearing or gear coupled to the lever arm and configured to allow the lever arm to smoothly pivot relative to the housing assembly about the first axis of rotation.

6. The control assembly of claim 1 wherein the linkage assembly is a four-bar linkage with a first coupling bar attached to the first drive shaft, a second coupling bar attached to the second drive shaft, and a pair of linkage bars spaced apart and each interconnecting the first and second coupling bars.

7. The control assembly of claim 1, further comprising a movement dampener connected to the linkage assembly or the harmonic gearbox assembly.

8. The control assembly of claim 1, further comprising an angle displacement sensor coupled to the lever arm and configured to detect angular displacement of the lever arm.

9. The control assembly of claim 8, further comprising a rotation multiplier gear coupled to the angle displacement sensor and the lever arm.

10. The control assembly of claim 1 wherein the strain wave gear has a gear ratio in the range of approximately 80:1-150:1.

11. A control assembly for a vehicle having a vehicle control system, comprising:
a housing assembly fixedly attached to the vehicle;
a control arm assembly having a lever arm rotatable about a first axis of rotation in a first fixed position in the housing assembly, and a grip attached to the lever arm and configured to be gripped by a user;
a harmonic gearbox assembly mounted in a second fixed postion in the housing assembly and having a strain wave gear coupled to a drive shaft spaced apart from the lever arm, wherein the drive shaft is rotatable about a second axis of rotation spaced apart from the first axis of rotation by a fixed position,wherein rotation of the strain wave gear is coupled to rotation of the drive shaft;
a linkage assembly interconnecting the lever arm and the drive shaft, and wherein rotation of the drive shaft about the second axis of rotation pivots the linkage assembly about the first and second axes of rotation and pivots the lever arm about the first axis of rotation; and
a motor at least partially controlled by the vehicle control system and connected to the harmonic gear box assembly for rotation of the strain wave gear that provides a direct, clutch-free connection between the motor, the harmonic gearbox assembly, the linkage assembly and the control arm assembly, wherein the harmonic gearbox assembly is configured to be back driven to provide active resistance to pivotal movement of the lever arm.

12. The control assembly of claim 11 wherein the control arm assembly is a collective inceptor assembly, and further comprising a cyclic control assembly and a tail rotor control assembly operatively coupled to the vehicle control system.

13. The control assembly of claim 11 wherein the linkage assembly is a four-bar linkage with a first coupling bar coupled to the lever arm and pivotable about the first axis of rotation, a second coupling bar attached to the drive shaft, and a pair of linkage bars spaced apart and each interconnecting the first and second coupling bars.

14. The control assembly of claim 11, further comprising a movement dampener connected to the linkage assembly or the harmonic gearbox assembly.

15. The control assembly of claim 11, further comprising an angle displacement sensor coupled to the lever arm and configured to detect angular displacement of the lever arm.

16. The control assembly of claim 11, further comprising a rotation multiplier gear coupled to the lever arm.

17. The control assembly of claim 11 wherein the strain wave gear has a gear ratio in the range of approximately 80:1-150:1.

18. A collective inceptor assembly for a vehicle having a vehicle control system, comprising:
a mounting structure mountable to the vehicle;
a first drive shaft rotatably connected to the mounting structure, wherein the first drive shaft is rotatable about a first axis of rotation located in a first fixed position in the mounting structure;
a collective lever arm connected at a first end portion to the first drive shaft, wherein the collective lever arm is pivotable with the first drive shaft relative to the mounting structure about the first axis of rotation;
a grip connected to a second end portion of the collective lever arm spaced apart from the first end portion, wherein the grip has a plurality of control elements coupled to the vehicle control system and positioned for engagement by a user for operation of at least a portion of the vehicle;
a harmonic gearbox assembly mounted in second fixed position relative to the mounting structure and having at least one harmonic gear and a second drive shaft, wherein the harmonic gear and the second drive shaft are rotatable relative to the mounting structure about a second axis of rotation spaced apart from the first drive shaft by a fixed distance;
a linkage assembly interconnecting the first and second drive shaft the linkage assembly mechanically transmits rotational movement of the first drive shaft to rotational movement of the second drive shaft; and;
a motor at least partially controlled by the vehicle control system and connected to the harmonic gear box assembly with a clutch-free interface that provides direct connection between the collective lever arm, the linkage assembly, the harmonic gearbox assembly, and the motor, wherein the harmonic gearbox assembly is configured to be back driven to provide active resistance to pivotal movement of the collective lever arm.

19. The collective inceptor assembly of claim 18, wherein the linkage assembly is a four-bar linkage with a first coupling bar coupled to the first drive shaft and pivotable about the first axis of rotation, a second coupling bar substantially parallel to the first coupling bar and attached to the second drive shaft and pivotable about the second axis of rotation, and a pair of substantially parallel, spaced apart linkage bars each interconnecting the first and second coupling bars.

20. The control assembly of claim 19, further comprising a movement dampener connected to the linkage assembly or the harmonic gearbox assembly.

21. The control assembly of claim 18, further comprising an angle displacement sensor coupled to the lever arm and a rotation multiplier gear coupled to the angle displacement sensor and the collective lever arm.

22. The control assembly of claim 18 wherein the harmonic gear has a gear ratio in the range of approximately 80:1-150:1.

23. The control assembly of claim 18, wherein the harmonic gear box assembly has a strain wave gear fixedly connected to the second drive shaft for rotation about the second axis of rotation.

24. The control assembly of claim 1 wherein the first and second portions of the lever arm are first and second end portions, respectively, and the linkage assembly includes a first coupling bar fixedly attached to the first drive shaft, a second coupling bar fixedly attached to the second drive shaft and being substantially parallel to the first coupling bar, and a pair of spaced apart, substantially parallel linkage bars each pivotally connected to each of the first and second coupling bars.

* * * * *